United States Patent
Roelleke et al.

(10) Patent No.: US 7,519,460 B2
(45) Date of Patent: Apr. 14, 2009

(54) DEVICE FOR RECOGNITION OF A POLE CRASH

(75) Inventors: Michael Roelleke, Leonberg-Hoefingen (DE); Marc Theisen, Darmstadt (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 10/523,733

(22) PCT Filed: Mar. 11, 2003

(86) PCT No.: PCT/DE03/00765

§ 371 (c)(1),
(2), (4) Date: Dec. 30, 2005

(87) PCT Pub. No.: WO2004/018264

PCT Pub. Date: Mar. 4, 2004

(65) Prior Publication Data

US 2006/0106529 A1    May 18, 2006

(30) Foreign Application Priority Data

Aug. 1, 2002  (DE) ................ 102 35 164

(51) Int. Cl.
 *B60R 21/01* (2006.01)
(52) U.S. Cl. .................. 701/45; 280/735; 342/72
(58) Field of Classification Search .............. None
See application file for complete search history.

(56) References Cited

U.S. PATENT DOCUMENTS

| 5,559,697 | A  | * | 9/1996 | Wang ............ 701/45 |
| 6,678,599 | B2 | * | 1/2004 | Eisele et al. ...... 701/45 |
| 2003/0176959 | A1 | * | 9/2003 | Breed ............ 701/36 |

FOREIGN PATENT DOCUMENTS

| GB | 2 330 935 | 5/1999 |
| WO | WO 01/81123 | 11/2001 |

\* cited by examiner

*Primary Examiner*—Michael J. Zanelli
(74) *Attorney, Agent, or Firm*—Kenyon & Kenyon LLP

(57) ABSTRACT

A device for recognizing a pole crash, situated in a vehicle. The pole crash is determined on the basis of an impact velocity, which is recognized by an environment sensor, and an acceleration, which occurs in upon impact and is recognized by an impact sensor. In particular, the time between the impact and the impact object hitting the engine block is determined to identify a pole crash.

3 Claims, 1 Drawing Sheet

DEVICE FOR RECOGNITION OF A POLE CRASH

BACKGROUND INFORMATION

The present invention relates to a device for detecting a pole crash.

SUMMARY

An example device according to the present invention for recognizing a pole crash may have the advantage that the pole crashes are more easily identified. A pole crash is understood here as a crash against a small-volume object, the structures provided for absorbing crash energy not being affected. This includes utility poles, masts, and wall edges. Pole crashes have the property that they have very small deceleration values in their initial phase. Due to the small impact surface and the non-involvement of the vehicle structures designed to absorb energy, which typically include the side members up to the bumper, initially only little energy is absorbed, and the pole penetrates deep into the vehicle front even at low impact velocities. Substantial deceleration does not occur until the pole hits the engine block. The deceleration is then much more intense than in the case of a higher-speed impact against a softer barrier, so that deployment of the restraining device is necessary to protect the occupants. This prevents the two types of crash from being confused with one another.

According to the present invention, the impact velocity and the distance between the first contact point, i.e., the bumper, and the engine block are known; therefore, it is possible to calculate the time to the initial occurrence of the high deceleration values. This permits a pole crash to be reliably recognized and the restraining device to be accurately controlled.

It may be particularly advantageous if the time between the moment of first impact between the impact object and the vehicle and the moment when the impact object hits the engine block is measured using the impact velocity and/or the acceleration. This may be used to identify a pole crash.

Finally, it may also advantageous if the environment sensor is designed either as a radar sensor or as an ultrasonic sensor.

BRIEF DESCRIPTION OF THE DRAWINGS

Exemplary embodiments of the present invention are illustrated in the figure and explained in more detail below.

DETAILED DESCRIPTION OF EXAMPLE EMBODIMENTS

Pole crashes are crashes in which an impact object, which initially causes only a slight deceleration of the vehicle, has a minimal surface area. In the initial phase, the acceleration signal of this crash corresponds with that of higher-speed crashes against soft, deformable barriers, for example, of a vehicle-vehicle crash. In some cases, the acceleration values are even lower. It is required, however, that the airbag or other restraining device does not deploy in crashes against soft barriers, but they must deploy in pole crashes.

According to an example embodiment of the present invention, the processor in the control unit which evaluates the sensor signals of a sensor for detecting the impact velocity and/or a sensor for detecting the acceleration is configured in such a way that the processor is able to better identify a pole crash. This is advantageously possible by measuring the time between the moment of first impact of the impact object against the vehicle and the moment the impact object hits the engine block. A pole crash is easily identifiable from this time via signal analysis.

Impact object is understood here as any object which collides with the vehicle in which the device according to the present invention for detecting a pole crash is installed. In this application, this will typically mean a utility pole. However, it may also be any other object causing such a pole crash.

Figure 1:
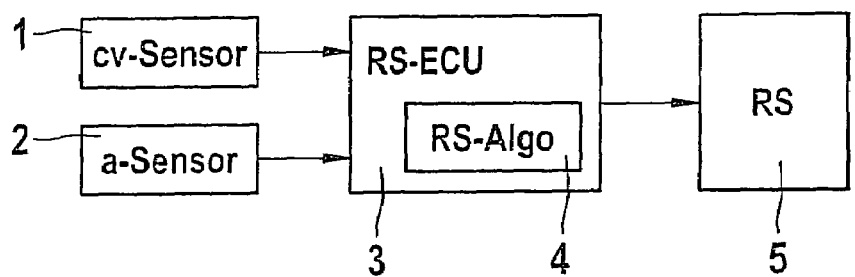
FIG. 1 shows a block diagram of an example device according to the present invention.

FIG. 1 shows an example device according to the present invention as a block diagram. An environment sensor 1 is connected to a control unit 3 via a first data input. Furthermore, an acceleration sensor 2 is connected to a second data input of control unit 3. A processor 4 running an algorithm used for recognizing a pole crash is situated in control unit 3. It is possible that other algorithms are run in addition to this algorithm to identify different crash types and thus to permit deployment of restraining devices as appropriate. Control unit 3 is connected to restraining device 5 via a data output. The restraining device 5 may include, for example, airbags and/or seat belt tighteners, and/or a rollover bar. The trigger for restraining device 5 may be situated either in control unit 3 or in restraining device 5.

Only one environment sensor 1 and one acceleration sensor 2 are illustrated here as an example. It is, however, possible to use more than one environment sensor 1 and more than one acceleration sensor 2. In the present case both sensors 1 and 2 are situated outside the control unit. A unidirectional data transmission from sensors 1 and 2 to control unit 3 is also provided here in particular. This line may also be used for powering sensors 1 and 2 from control unit 3. Environment sensor 1 is a radar sensor or ultrasonic sensor, for example, and is preferably installed in the front of the vehicle. It is possible to place additional environment sensors on the vehicle body to permit complete environment sensing around the vehicle. Using a radar sensor or ultrasonic sensor, it is possible, in particular, to determine the velocity of an object that has been detected. Acceleration sensor 2 is used as an impact sensor, i.e., acceleration sensor 2 does not register significant acceleration until an impact occurs; the reduction of velocity may be determined from this acceleration by simple integration and the forward displacement may be determined by double integration. In a pole crash significant forward displacement occurs when the pole hits the engine block, which may be hazardous to the occupants' bodily integrity if the restraining device is not employed. Therefore, the use of a restraining device at an appropriate point in time is necessary in the event of such a pole crash.

An acceleration sensor may be additionally or alternatively situated in control unit 3 itself. In addition to acceleration sensor 2, it is also possible to use other sensors for detecting an impact. Such sensors include in particular deformation sensors or indirect deformation sensors, such as temperature sensors or pressure sensors. Control unit 3 is typically situated at the center of the vehicle, e.g., on the vehicle tunnel. It is, however, possible to associate this control unit with each of the individual sensors, the control unit communicating, for example via a vehicle bus, with another control unit which then triggers restraining means 5.

Figure 2:
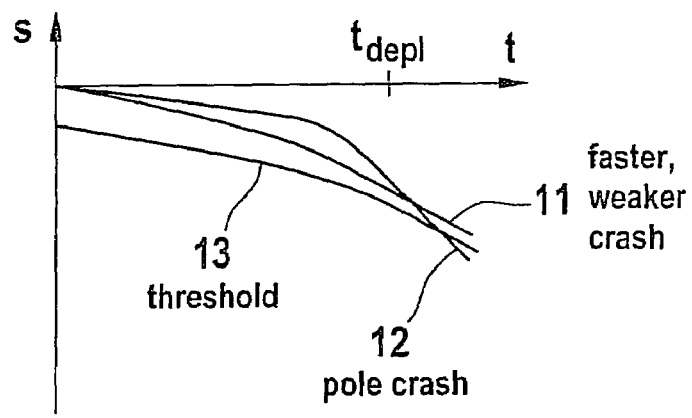
FIG. 2 shows a diagram for illustrating a pole crash.
Figure 3:
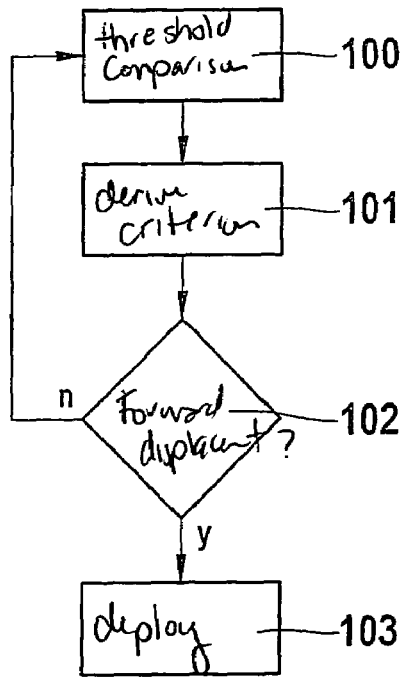
FIG. 3 shows a flow chart of an example method according to the present invention.

FIG. 3 illustrates the algorithm running on processor 3. In method step 100, sensors 1 and 2 determine the impact velocity or the acceleration which is occurring. The reduction in velocity and the forward displacement are determined by integrating the acceleration signal. This provides the particular advantage that high-frequency components are filtered out of the signal. The forward displacement signal is the most robust and is to be therefore preferably used. An object of the example method according to the present invention is to correctly recognize a pole crash and to distinguish it from a higher-speed crash against a softer barrier, such as another vehicle. The pole crash has a smaller forward displacement at the time of deployment than the higher-speed, softer crash. As a result, the pole crash, as shown by curve 12 in FIG. 2, is further above deployment threshold 13 than non-deploying, higher-speed, softer crash 11. FIG. 2 shows a distance-time diagram. The double integral of acceleration is used here. Threshold 13 is a function of the measured impact velocity.

The method is now started in method step 100 and the threshold comparison is carried out according to FIG. 2. Up to the moment of deployment, the pole crash has a smaller forward displacement than the higher-speed, softer crash. As FIG. 2 shows, pole crash 11 is therefore further above deployment threshold 12 than non-deploying, higher-speed, softer crash 13. The pole crash would therefore be classified as a non-deployer. An additional deployment criterion must therefore be derived in method step 101. This discussion is based on the fact that in a pole crash significant deceleration occurs when the engine block is hit. The impact velocity and the distance between the bumper and the engine block are known, and therefore the time between the first crash contact and the moment the pole hits the engine block may be computed using the formula time=distance/impact velocity. Approximately at this time, significant deceleration and significant increase in forward displacement must be observed. A pole crash is then recognized and the restraining device is deployed accordingly. This makes very accurate deployment of the restraining device possible. This comparison is performed in method step 102, where a check is performed as to whether there is forward displacement at this time. If this is the case, the method jumps to method step 103, and the restraining device 5 is deployed accordingly. If this is not the case, the method jumps back to method step 100.

What is claimed is:

1. A device for recognizing a pole crash, comprising:
   at least one environment sensor to determine an impact velocity;
   at least one impact sensor to determine an acceleration occurring in a crash; and
   a processor configured to detect the pole crash on the basis of the impact velocity and the acceleration and to activate a restraining device as a function thereof;
   wherein the processor is configured to determine a time between a moment of impact and a moment an impact object strikes an engine block, using the impact velocity and the acceleration, the processor determining the pole crash as a function of the time.

2. The device as recited in claim 1, wherein the at least one environment sensor is a radar sensor.

3. The device as recited in claim 1, wherein the at least one environment sensor is an ultrasonic sensor.

* * * * *